June 15, 1926.

E. H. RAHN

BALL BEARING

Filed June 23, 1924

1,588,993

Inventor
Ernest H. Rahn,
By Dyrenforth, Lee, Chritton & Wiles
Attys

Patented June 15, 1926.

1,588,993

UNITED STATES PATENT OFFICE.

ERNEST H. RAHN, OF CHICAGO, ILLINOIS, ASSIGNOR, BY MESNE ASSIGNMENTS, TO MARLIN-ROCKWELL CORPORATION, OF JAMESTOWN, NEW YORK, A CORPORATION OF NEW YORK.

BALL BEARING.

Application filed June 23, 1924. Serial No. 721,809.

This invention relates to ball bearings and particularly to their application to hanger boxes for use on line shafting wherein it is necessary to provide some means for preventing the inner race-members from turning on the shaft to prevent undue wear of the shaft at this point.

The primary object of this invention is to provide such a means for holding these standard inner raceways without drilling or notching them.

This and other objects are accomplished by this invention and fully described in the following specification and shown in the accompanying drawings, in which.

Figure 1:
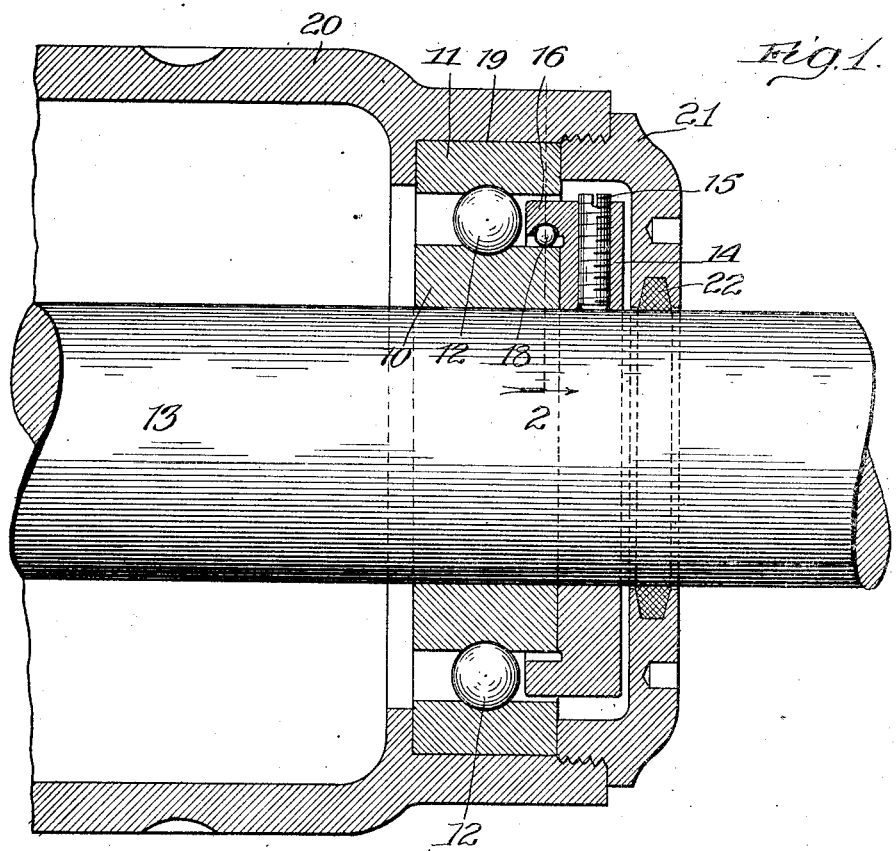
Figure 1 is a longitudinal section of a hanger box embodying the invention.
Figure 2:
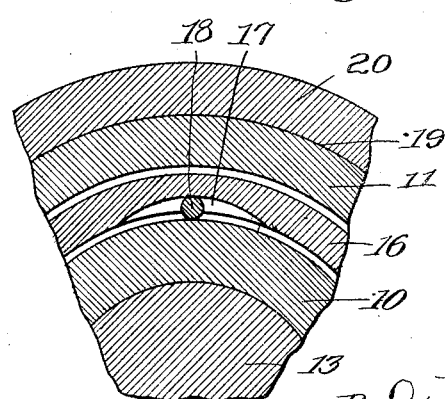
Fig. 2 is a partial transverse section on the line 2 of Fig. 1.

The embodiment illustrated comprises a well known type of single row radial ball bearing having inner race-members 10 and 11 respectively with a set of balls 12 rolling in suitable raceways. The inner race-member 10 is mounted upon a piece of cold rolled steel shafting 13 which is usually slidably mounted in the bore of the inner race-member 10 so that some means is required to secure the inner race-member 10 firmly to the shaft to prevent the relatively softer shaft from being pounded and injured by the inner race-member 10 as the shaft is turned.

To accomplish this I have provided a collar 14 which is secured on the shaft 13 by means of a set-screw 15, the collar 14 having a portion 16 extending into the annular space between the inner and outer race-members and provided with an eccentric groove 17 upon the inner surface which faces the inner race-member. A ball or other anti-friction member 18, is placed between this groove and the outer surface of the inner race-member.

The outer race-member 11 is secured within the bore 19 in the housing 20 by means of a cover 21 which is fastened at the end of the housing. This cover also encloses the collar 14 and has a felt washer 22 which bears upon the shaft 13 and thus prevents dust and moisture from entering the hanger box.

It will be understood from the foregoing that as the shaft 13 revolves in either direction, any movement of the race-member 10 relative to the shaft will cause the ball 18 to roll toward one end or the other of the groove 17, and as it does this the ball will become wedged between the converging surfaces of the outer face of the inner race-member and of the groove 17, thereby preventing further rotation of the inner race-member relative to the shaft.

While I have shown and described but a single embodiment of this invention, it is to be understood that it is capable of many modifications. Changes therefore in the construction and arrangement may be made which do not depart from the spirit and scope of the invention as disclosed in the appended claims.

I claim:

1. In combination, an anti-friction bearing having inner and outer race-members and anti-friction elements therebetween, a shaft passing through said inner race-member, a member adapted to be secured to said shaft having a portion overlying a part of the inner race-member and extending between said members, and a movable means carried by said portion for preventing said inner race-member from turning on said shaft, said means being movable with respect to both said race-members.

2. In combination, an anti-friction bearing having inner and outer race-members and antifriction elements therebetween, a shaft passing through said inner race-member, a member adapted to be secured to said shaft having a flange overlying a part of the inner race-member, an eccentric groove in said flange facing said inner race-member, and an anti-friction member in said groove adapted to bear on said inner race-member to prevent said inner race-member from turning on said shaft.

3. In combination, an anti-friction bearing having inner and outer race-members and anti-friction elements therebetween, a shaft passing through said inner race-member, a member adapted to be secured to said shaft having a portion overlying a part of the inner race-member, an eccentric groove in said flange facing said inner race-member, and a ball in said groove adapted to bear on said inner race-member to prevent said inner race-member from turning on said shaft.

ERNEST H. RAHN.